(12) United States Patent
Arfstrom et al.

(10) Patent No.: US 6,938,402 B2
(45) Date of Patent: Sep. 6, 2005

(54) MOWING BLADES HAVING AN IMPACT ENERGY ABSORBING STRUCTURE

(75) Inventors: Jack E. Arfstrom, Rubicon, WI (US); John W. Hopkins, Charlotte, NC (US); David J. Pahl, Charlotte, NC (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/285,864

(22) Filed: Nov. 1, 2002

(65) Prior Publication Data

US 2004/0083700 A1 May 6, 2004

(51) Int. Cl.⁷ .......................... A01D 34/52; A01D 34/73
(52) U.S. Cl. .......................................... 56/295; 56/255
(58) Field of Search ................... D15/14–17; 30/276, 30/347, 390; 56/255, 295, 289

(56) References Cited

U.S. PATENT DOCUMENTS

| | | |
|---|---|---|
| 2,484,511 A | 10/1949 | Ingalls et al. |
| 2,627,156 A | 2/1953 | Carter |
| 3,252,304 A | 5/1966 | Moody |
| 3,398,517 A | 8/1968 | Freedlander et al. |
| 3,507,104 A | 4/1970 | Kline |
| 3,690,051 A | 9/1972 | Wood |
| 3,780,509 A * | 12/1973 | Woelffer ...................... 56/295 |
| 3,781,991 A | 1/1974 | Stretton et al. |
| 3,910,017 A | 10/1975 | Thorud et al. |
| 4,205,512 A * | 6/1980 | Thorud ....................... 56/13.4 |
| 4,229,933 A | 10/1980 | Bernard |
| 4,250,622 A | 2/1981 | Houle |
| 4,265,018 A | 5/1981 | Schrock et al. |
| 4,300,336 A | 11/1981 | Miyata |
| 4,313,297 A | 2/1982 | Maier |
| 4,375,148 A * | 3/1983 | Beck ........................... 56/295 |
| 4,471,603 A | 9/1984 | Veltin, Jr. |
| 4,513,563 A | 4/1985 | Roser et al. |
| 4,525,990 A | 7/1985 | Zweegers |
| 4,594,843 A | 6/1986 | Anderson et al. |
| 4,651,510 A | 3/1987 | Malutich |
| 4,778,208 A | 10/1988 | Lehr et al. |
| 5,035,108 A * | 7/1991 | Meyer et al. ................. 56/13.4 |
| 5,077,961 A | 1/1992 | Schumacher, II et al. |
| 5,090,186 A | 2/1992 | Andersen |
| 5,094,065 A * | 3/1992 | Azbell ......................... 56/255 |
| 5,199,251 A * | 4/1993 | Rouse et al. .................. 56/255 |
| 5,209,052 A * | 5/1993 | Carroll ......................... 56/255 |
| 5,271,212 A | 12/1993 | Anderson |
| 5,327,710 A * | 7/1994 | Plamper et al. ............... 56/255 |
| 5,430,943 A | 7/1995 | Lee |
| 5,501,068 A * | 3/1996 | Martz ........................... 56/255 |
| 5,711,141 A * | 1/1998 | Pitman et al. ................ 56/255 |
| 6,189,941 B1 | 2/2001 | Nohr |
| 6,199,924 B1 | 3/2001 | Oguri et al. |
| 6,301,868 B1 | 10/2001 | Siplinger |
| 6,312,028 B1 | 11/2001 | Wilkosz |
| 6,427,341 B1 | 8/2002 | Lee |
| 6,490,850 B1 * | 12/2002 | Seegert et al. ............... 56/295 |
| 6,769,236 B2 * | 8/2004 | Schaedler ..................... 56/295 |
| 2003/0041581 A1 * | 3/2003 | Deschamps et al. .......... 56/295 |

FOREIGN PATENT DOCUMENTS

| | | |
|---|---|---|
| DE | 2010882 | 3/1971 |
| DE | 1963836 | 6/1971 |
| DE | 29900270 U1 | 3/1999 |
| EP | 0 027 728 A1 | 4/1981 |
| EP | 0 280 393 A1 | 8/1988 |
| FR | 1532050 | 7/1968 |
| FR | 2431244 | 2/1980 |
| GB | 1198518 | 7/1970 |
| GB | 2023390 A | 1/1980 |
| GB | 2036524 A | 7/1980 |

OTHER PUBLICATIONS

Oregon Produktkatalog 2001, Blount GMBH, Sep. 3, 2001.

* cited by examiner

Primary Examiner—Árpád Fábián Kovács
(74) Attorney, Agent, or Firm—Bell, Boyd & Lloyd, LLC (57) ABSTRACT

Mowing blades which include a one-piece member having a drive mechanism coupling section, a deformation section and a cutting section. When the mowing blades receive a particular load from an obstructing object, the deformation section deforms, dissipates energy and reduces damage to drive mechanisms of mowing machines.

22 Claims, 8 Drawing Sheets

MOWING BLADES HAVING AN IMPACT ENERGY ABSORBING STRUCTURE

BACKGROUND OF THE INVENTION

The present invention generally relates to mowing blades. More specifically, the present invention relates to mowing blades which have an impact energy absorbing structure.

Walk-behind lawn mowers, riding lawn mowers, tractors and other mowing machines have mowing blades which rotate at a relatively high speed to cut grass and other materials. From time to time, operators mistakenly move the mowing machines into the path of stakes, pipes, rocks or other obstructing objects. When this occurs, the impact of the obstructing object can cause damage to the mowing blade as well as damage to the drive mechanism of the mowing machine. Damage to the drive mechanism can render the mowing machine inoperable, requiring relatively expensive repairs. In some cases, damage to the drive mechanism can require replacement of the entire mowing machine.

There are existing mowing blades which include blade tips connected with fasteners to the body of the blade. If the blade tips strike an obstructing object, the blade tips can pivot. As a result, less damaging force is transmitted to the drive mechanism of the mowing machine.

This type of mowing blade has several disadvantages. The multiple parts require regular maintenance to ensure the fasteners remain tight. In addition, this blade could require adjustment even when the blade has not struck an obstructing object. For example, the fasteners can come loose when an operator is cutting relatively dense grass or wet grass or even when the blade strikes objects (such as wood chunks or sand) which might not cause damage to the drive mechanism. Such maintenance can be inconvenient and can also cause operators to incur adjustment expenses. Also, this blade can pose a hazard in that the blade tips can come apart during operation and possibly strike an operator or bystander. In addition, this blade can be relatively complex and expensive to manufacture due to the multiple parts. Generally, this blade has inherent performance restrictions due to its multiple parts.

Therefore, there is a need to overcome these disadvantages.

SUMMARY OF THE INVENTION

The present invention relates to cutting or mowing blades which have an impact absorbing structure to reduce damage to drive mechanisms of mowing machines. A mowing blade can include a cutting blade or any other type of blade which can mow, trim, move or otherwise treat materials, such as grass. In one embodiment, the mowing blade is a one-piece member which has: (a) a drive connection region which connects to the drive mechanism of a mowing machine; (b) a plurality of cutting regions; and (c) a deformation region in between each of the cutting sections and the drive connection region. The deformation region has a shape which facilitates its deformation when the blade is under a load. Preferably, the deformation region decreases in width from the width of the drive connection region to a minimum width and then increases to the width of the cutting region. It is also preferable that the deformation region has a bend or ramp shape which extends from an upper plane of the drive connection region to a lower plane of the cutting region.

In operation, when the cutting region strikes an obstructing object, such as a steel stake or rock, the force of the obstructing object is transmitted first to the cutting region and then to the deformation region. If the force is great enough, the deformation region will protect the drive mechanism by absorbing some or all of the force. The amount of force which is necessary to bend the deformation region is related to the amount of force which is dissipated or diverted away from the drive mechanism. If the force from the obstructing object is relatively large, the mowing blade will undergo a relatively significant bend in the deformation region, and the mowing blade may continue to rotate. The operator will notice that the blade is bent by seeing a non-uniform cutting pattern, hearing a noise caused by the bent blade striking the mowing deck or feeling an increase in vibration at the handle bar, steering wheel, foot pads or frame of the mowing machine. The operator can then replace the deformed blade, and continue operating the mowing machine with little or no damage having been done to the drive mechanism.

The mowing blade in one embodiment of the present invention, has a one-piece, integral structure which absorbs part of the impact received from obstructing objects in order to protect the drive mechanisms of mowing machines. The mowing blades include at least one deformation section which bends when the impact is received. The bending process absorbs part of the impact which, in effect, reduces the amount of damaging impact received by the drive mechanism of the mowing machine. This type of mowing blade increases the life of drive mechanisms of mowing machines.

It is therefore an advantage of the present invention to provide mowing blades having an impact energy absorbing structure.

Another advantage of the present invention is to increase the life of, and reduce damage to, drive mechanisms of mowing machines.

Yet another advantage of the present invention is to provide relatively high quality mowing blades which are relatively stiff and rigid for providing a uniform cut quality but which also deform when they strike obstructing objects.

Yet another advantage of the present invention is to eliminate separable parts and fasteners from mowing blades which yield or deform when they strike obstructing objects.

Still another advantage of the present invention is to reduce safety hazards when a mowing blade strikes an obstructing object.

Additional features and advantages of the present invention are described in, and will be apparent from, the following Detailed Description of the Invention and the figures.

DETAILED DESCRIPTION OF THE INVENTION

Figure 1:
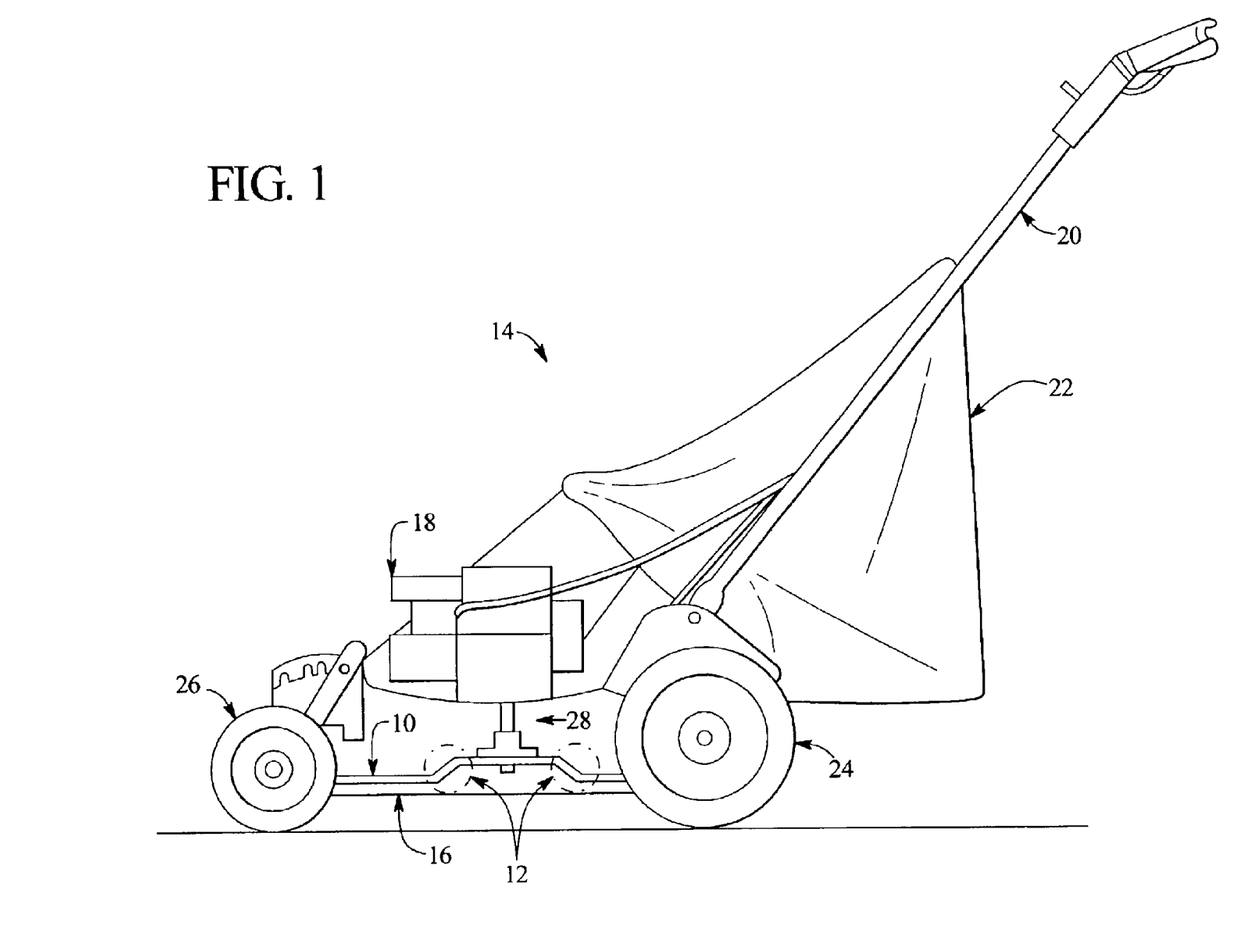
FIG. 1 is an elevated side view of a walk-behind lawn mower which includes the mowing blade in one embodiment of the present invention.
Figure 2:
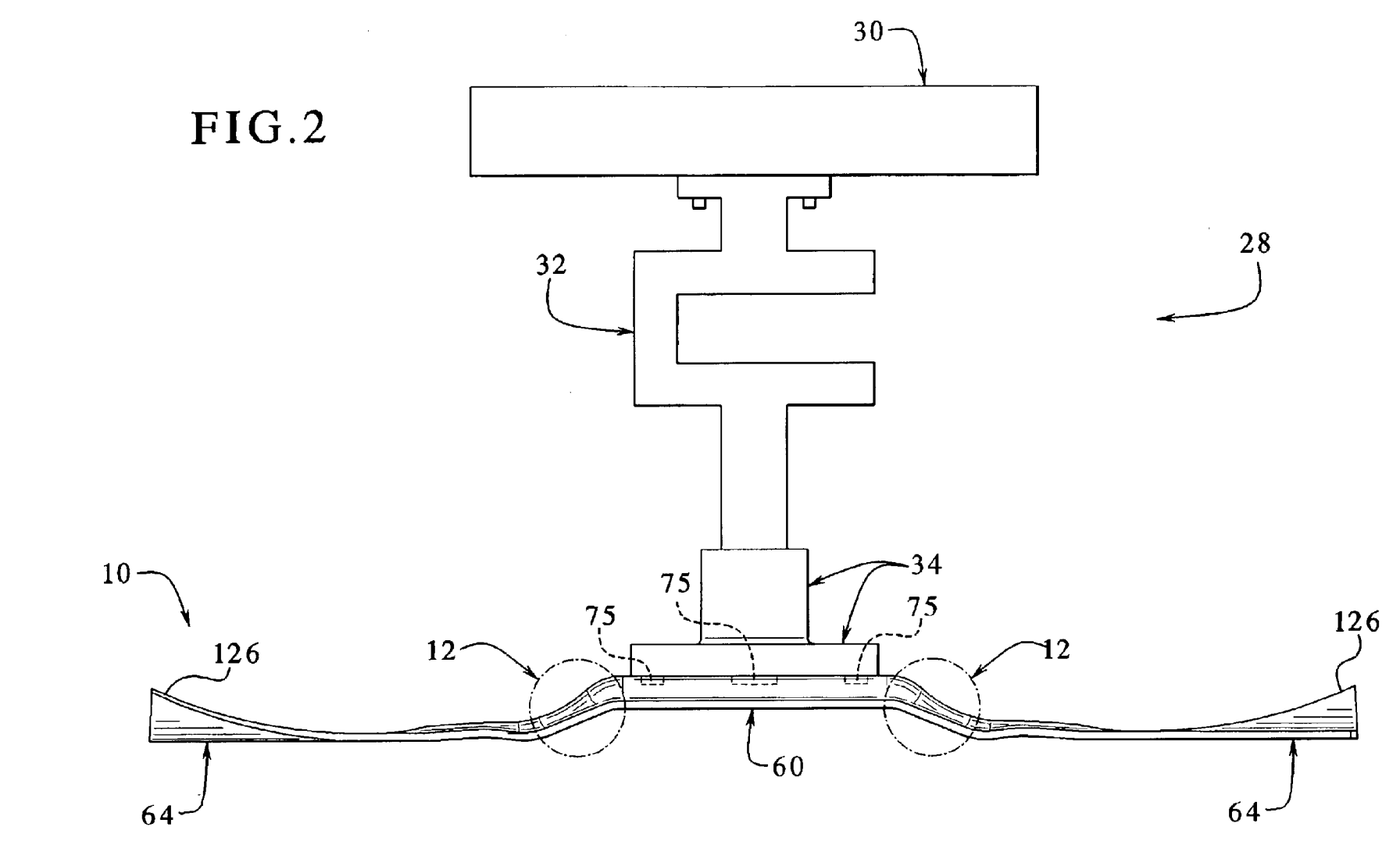
FIG. 2 is an elevated side view of a drive mechanism of a walk-behind lawn mower which includes the mowing blade in one embodiment of the present invention.

Referring now to the drawings, FIGS. 1 and 2 illustrate one embodiment of the cutting or mowing blade 10, having the energy dissipating deformation sections 12 described below, installed on a walk-behind lawn mower 14. In one embodiment, the mower 14 includes: (a) a frame 16 which supports an engine 18, a handle 20 and a material collector 22; (b) a plurality of rear wheels 24 rotatably connected to the frame 16; (c) a plurality of front wheels 26 rotatably connected to the frame 16; and (d) a drive assembly or drive mechanism 28 which operatively couples the engine 18 to the mowing blade 10.

The drive mechanism 28 includes: (a) a flywheel 30 coupled to and rotated by the engine 18; (b) a crank shaft or drive shaft 32 coupled to the flywheel 30; and (c) a fastening or securing member 34 which connects the drive shaft 32 to the mowing blade 10.

Figure 3:
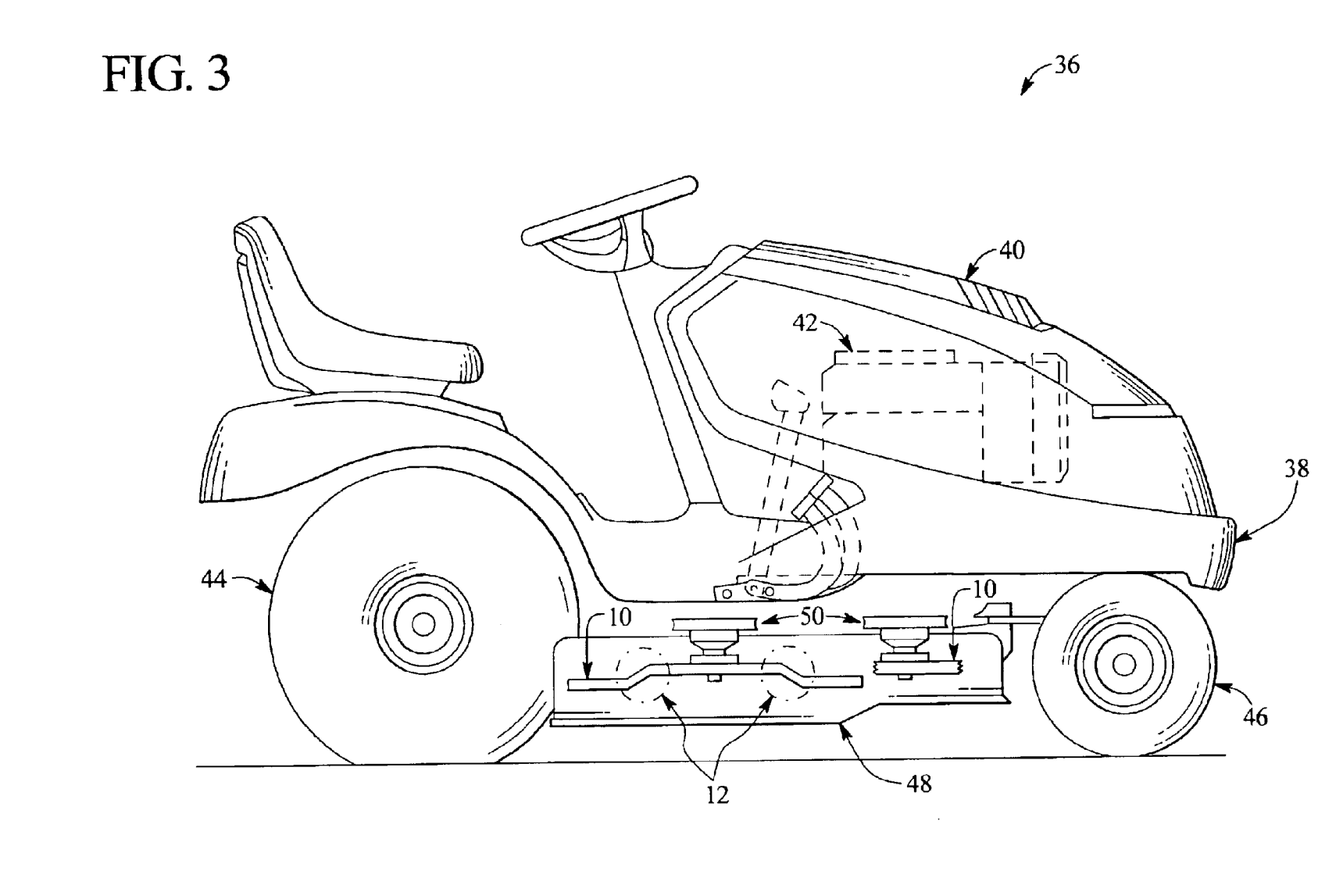
FIG. 3 is an elevated side view of a tractor which includes the mowing blades in one embodiment of the present invention.
Figure 4:
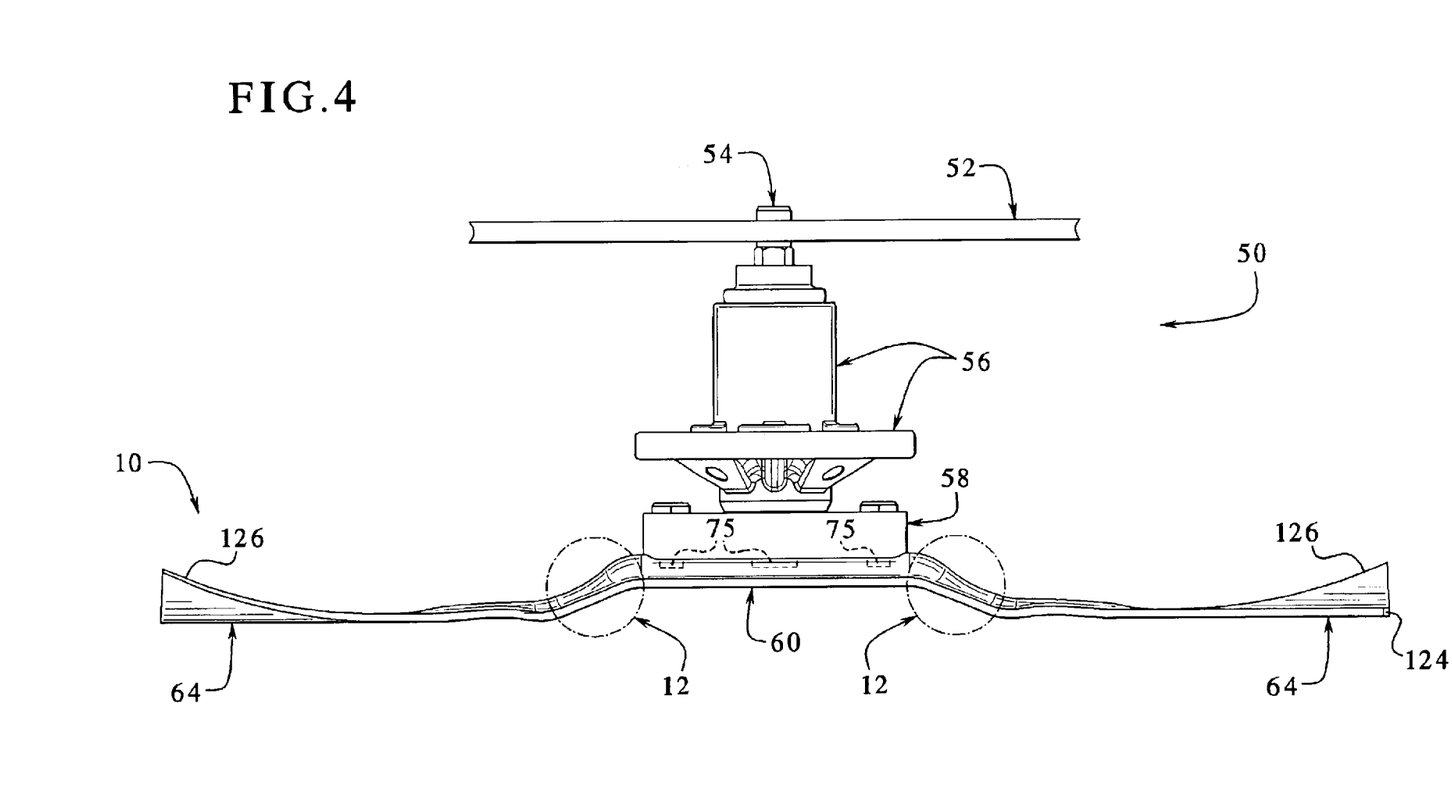
FIG. 4 is an elevated side view of a drive mechanism of a tractor which includes the mowing blades in one embodiment of the present invention.
Figure 5:
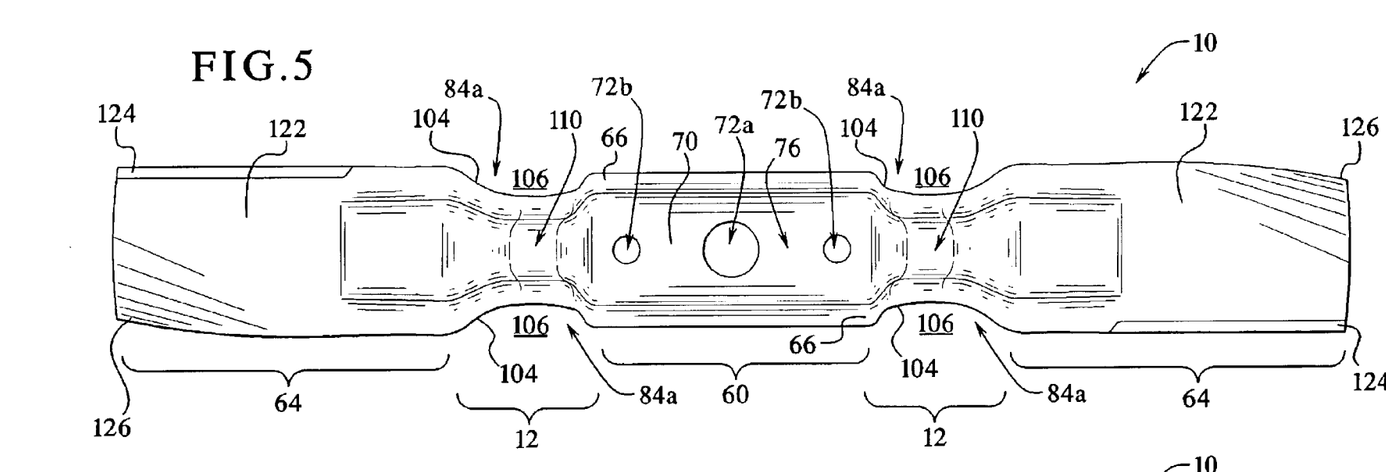
FIG. 5 is a top view of the mowing blade in one embodiment of the present invention.
Figure 6:
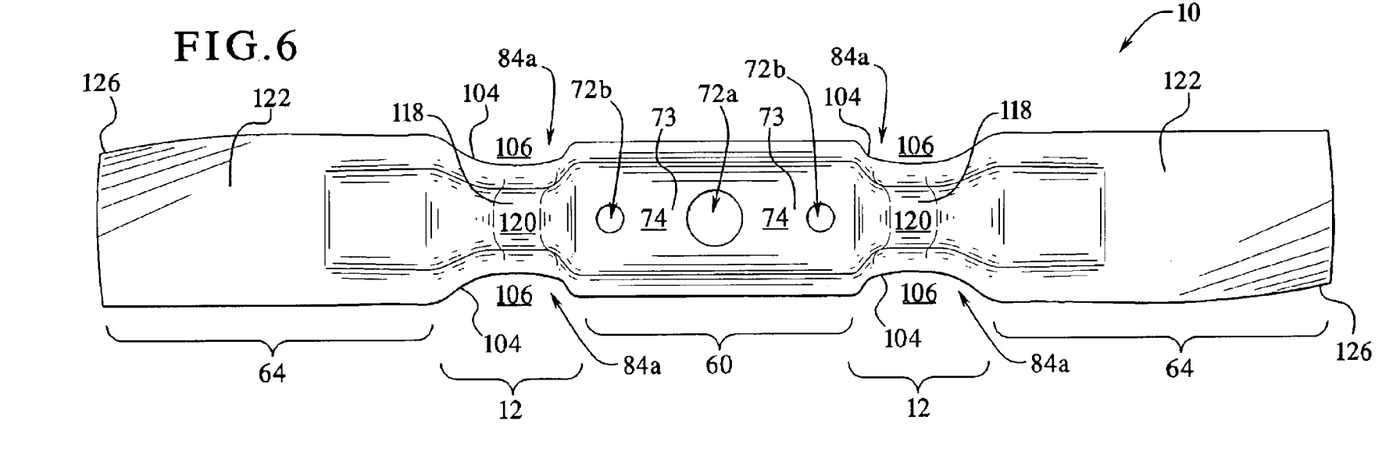
FIG. 6 is a bottom view of the mowing blade in one embodiment of the present invention.

In another embodiment illustrated in FIGS. 3 and 4, the cutting or mowing blade 10 of the present invention is installed on a tractor 36. The tractor 36, in one embodiment, includes: (a) a frame 38 which supports a body 40 and an engine 42; (b) a plurality of rear drive wheels 44 rotatably connected to the frame 38; (c) a plurality of front wheels 46 rotatably connected to the frame 38; (d) a mowing deck 48 supported by the frame 38; and (e) a drive assembly or drive mechanism 50 which transmits power from the engine 42 to the mowing blades 10.

The drive mechanism 50 preferably includes: (a) a drive belt (not shown) coupled to and driven by the engine 42; (b) a drive pulley 52 which engages with and is driven by the drive belt; (c) a spindle shaft or drive shaft 54 coupled to the drive pulley 52; (d) a spindle housing or drive shaft housing 56 which houses the drive shaft 54; and (e) a fastening or securing member 58 which connects the drive shaft 54 to the mowing blade 10.

The cutting or mowing blade 10 of the present invention has an impact energy absorbing structure which reduces the amount of force which is transmitted from an obstructing object to the drive mechanism of mower 14, tractor 36 or any other type of mowing machine. In one embodiment, the mowing blade 10 includes: (a) a drive mechanism coupling section 60 for connecting the mowing blade 10 to the drive mechanism 28 or 50; (b) at least one, and preferably a plurality of, energy-dissipating deformation sections 12; and (c) at least one, and preferably plurality of, cutting sections 64. The mowing blade 10 is preferably a one-piece bar or member, wherein the drive mechanism coupling section 60, the deformation section 12 and the cutting section 64 form an integral, unitary body.

In the illustrated embodiment, the mowing blade 10 has two cutting sections 64 which rotate about a vertical axis passing through the drive mechanism coupling section 60. However, in other embodiments not illustrated, the mowing blade of the present invention can have only one cutting section and one energy dissipating deformation section in which case, the sole cutting section rotates about a vertical axis passing through the drive mechanism coupling section.

The drive mechanism coupling section 60 preferably includes: (a) a flanged lower surface 66; (b) a plurality of side walls 68, preferably rounded, connected to and extending upwards from the lower surface 66; (c) and an upper surface 70 which is substantially flat and which defines at least one and preferably a plurality of securing openings 72a and 72b; and (d) an inner surface 73 which defines a void or cavity 74. Preferably, the securing openings include a center securing opening 72a and a plurality of side securing openings 72b. The securing openings 72a and 72b receive bolts or other suitable fasteners 75 which secure the coupling section 60 to the securing member 34 or 58 of the drive mechanism 28 or 50, respectively. The walls 68, as connected to the lower surface 66 and upper surface 70, define a stiffening structure or member 76 which reduces deflection of the mowing blade 10 along a vertical axis. It is preferable that the coupling section 60 has a substantially dome, downward cup or downward hat shape.

Figure 9A:
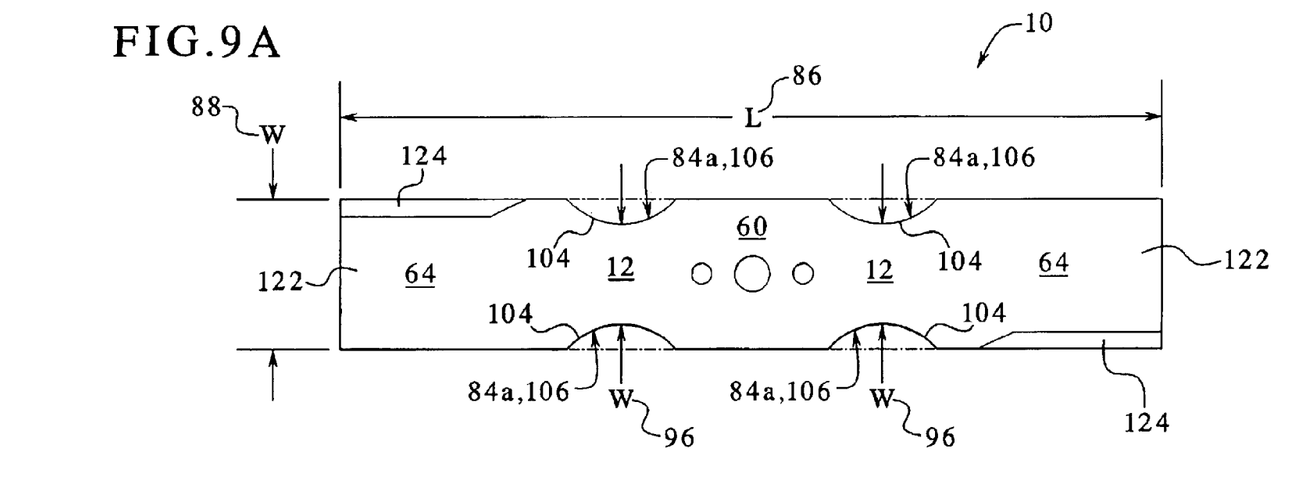
FIG. 9A is a top view of the mowing blade in one embodiment of the present invention superimposed over a uniform shape to illustrate contrast.
Figure 9B:
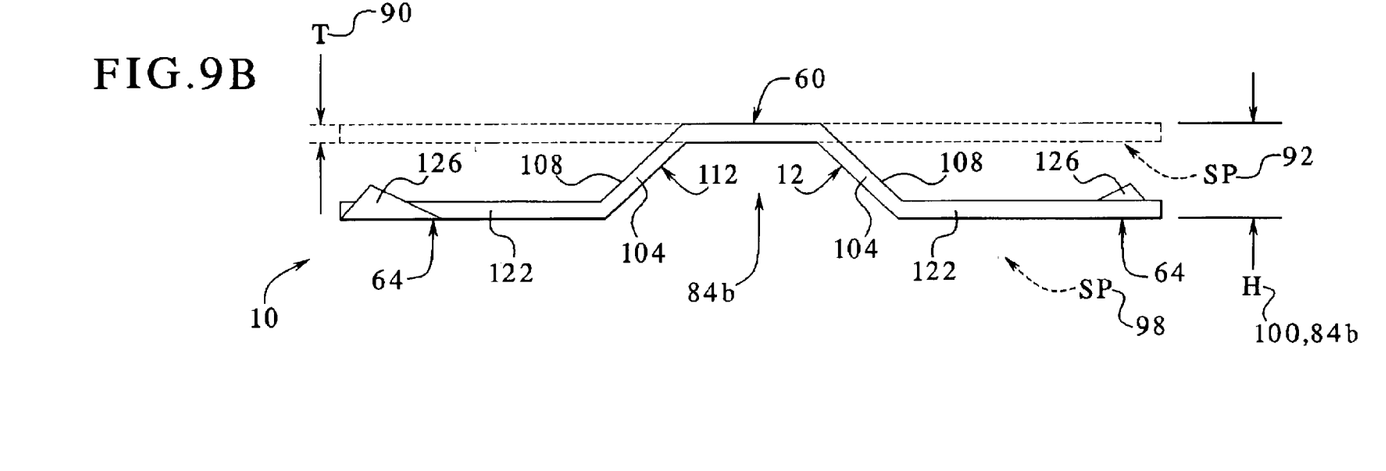
FIG. 9B is an elevated side view of the mowing blade of FIG. 9A superimposed over a uniform shape to illustrate contrast.

The energy-dissipating deformation section 12 includes or otherwise defines at least one, and preferably a plurality of, non-uniformities, discontinuities or geometric irregularities 84a and 84b in the mowing blade 10. Referring to FIG. 9, a regular or uniform shape for a blade is shown in dotted lines, illustrating a length (L) 86, a width (W) 88, a thickness (T) 90 and a side profile (SP) 92. In such uniform shape, the width 88, thickness 90 and side profile 92 do not change along the length 86.

In contrast, in mowing blade 10, the geometric irregularities 84a and 84b of the deformation section 12 preferably include: (a) a plurality of different widths (W) 88 and (W) 96; and (b) a side profile (SP) 98 defining a height (H) 100, functioning as irregularity 84b, which changes along the length (L) 86 of the mowing blade 10. Each geometric irregularity 84a and 84b facilitates the deformation of the deformation section 12 when the mowing blade 10 receives an impact load or force from an obstructing object.

It is preferable that the geometric irregularity 84a includes a notch wall 104 which defines a notch 106. The notch 106 can have any suitable shape, though the notch 106 is preferably substantially rounded or U-shaped or otherwise has an arc or parabolic shape. In addition, it is preferable that the geometric irregularity 84b is defined by a ramp or a bend portion 108 extending downwardly from the coupling section 60 to the cutting section 64. The bend portion 108 causes the upper surface 82 of the coupling section 60 to lie in a plane which is separated in distance from the plane in which the cutting section 64 lies. The distance between the plane of the coupling section 60 and the cutting section 64 determines the distance or height (H) 100 which facilitates the deformation of the deformation section 12. Specifically, it is thought that the bend portion 108 includes a lever arm which is acted upon by a line of force from an obstructing object. This lever arm facilitates the buckling and yielding of the deformation section 12.

Figures 7, 8:
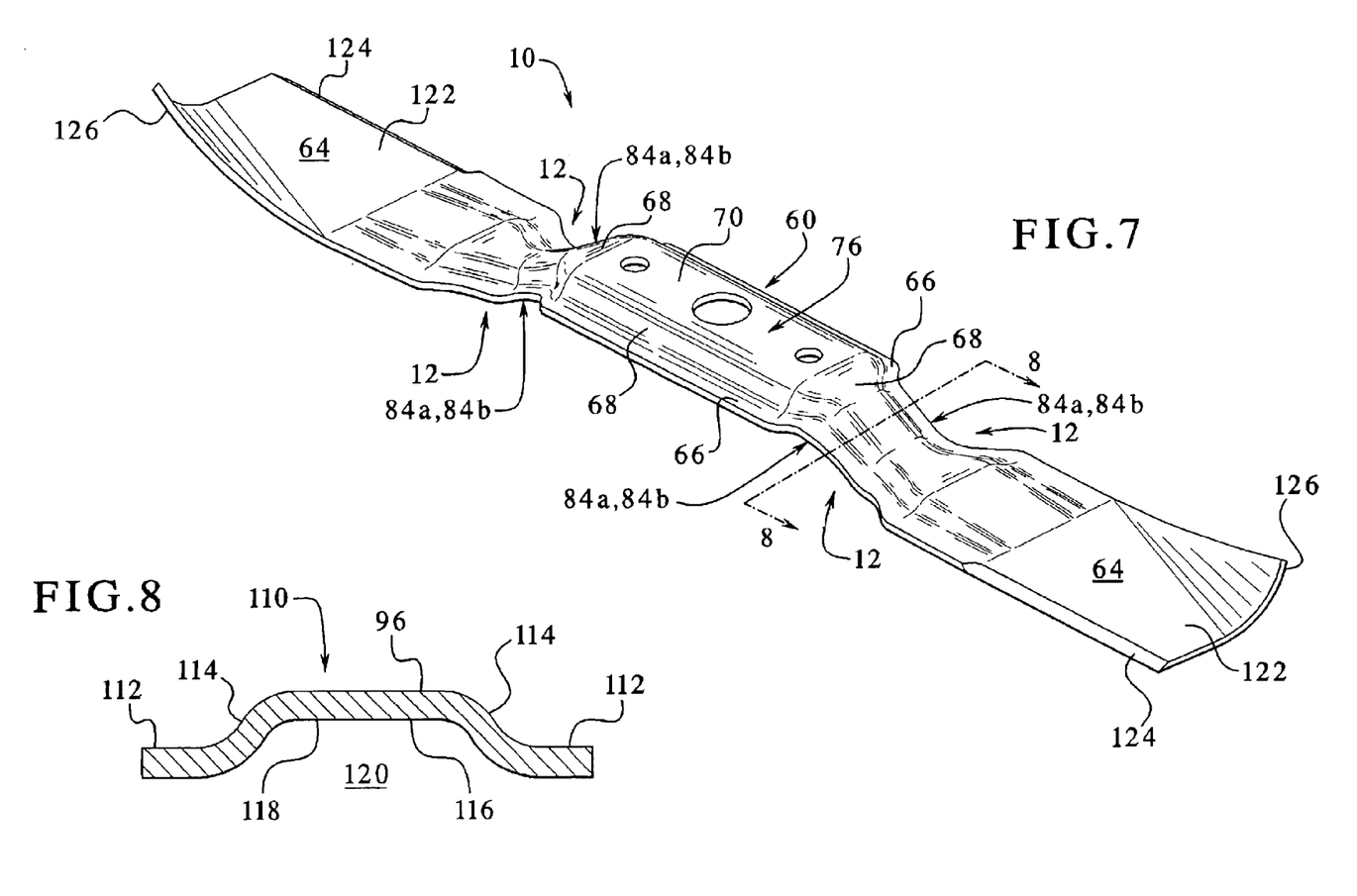
FIG. 7 is a top side perspective view of the mowing blade in one embodiment of the present invention.
FIG. 8 is a cross-sectional view of the deformation section of the mowing blade in one embodiment of the present invention, taken substantially along line 8—8 of FIG. 7.

As best shown in FIGS. 7 and 8, the deformation sections 12 also preferably include a stiffening structure or member 110, an additional geometric irregularity, which provides stiffness and rigidity to the deformation section 12. The stiffening member 110 includes: (a) a flanged lower surface 112; (b) a plurality of walls 114, preferably rounded, connected to and extending upward from the lower surface 112; (c) an upper surface 96, preferably rounded, connected to the walls 114; and (c) an inner surface 116 which defines a cavity 120. Preferably, the stiffening member 110 provides the deformation sections 12 with a downward U-shape or dome-shaped configuration.

The cutting section 64 of the mowing blade 10 includes a substantially flat surface or member 122 which has a select width (W) 88 and length. As described above, the width 88 is greater than the minimum width (W) 96 of the deformation section 12. The width (W) 88 of the cutting section 64, though illustrated as substantially equal to the width of the coupling section 60, can be of any select dimension which is suitable for cutting purposes. The cutting section 64 includes: (a) a cutting edge 124 which is preferably downwardly angled for the purpose of cutting grass and other materials; and (b) a cutting performance member 126 which is preferably a bent edge of the member 122. The cutting performance member 126 can facilitate particular airflow dynamics and air lifting forces for cutting material during the operation of the mowing machine. In one embodiment, the cutting performance member 126 facilitates the mulching of cut material. It should be appreciated that the mowing blade of the present invention need not include cutting performance member 126.

It is preferable that the mowing blade 10 is constructed of a steel bar or body having a substantially uniform thickness. The mowing blade 10 is preferably constructed from either hot or cold rolled bar or strip stock. The composition of the mowing blade 10 is preferably a relatively high grade carbon or alloy steel having an ultimate strength in the range of nine hundred sixty to one thousand eight hundred MPa and a yield strength in the range of seven hundred to fifteen hundred MPa. In one embodiment, the steel has an ultimate strength of fourteen hundred MPa and a yield strength of one thousand eighty-nine MPa.

Figure 10A:
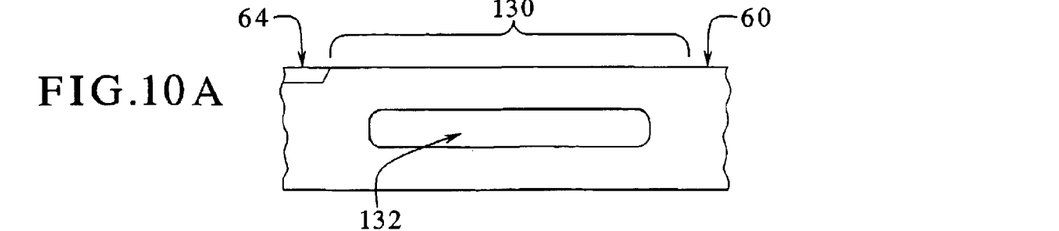
FIG. 10A is a top view of a deformation section of the mowing blade in another embodiment of the present invention.
Figure 10B:
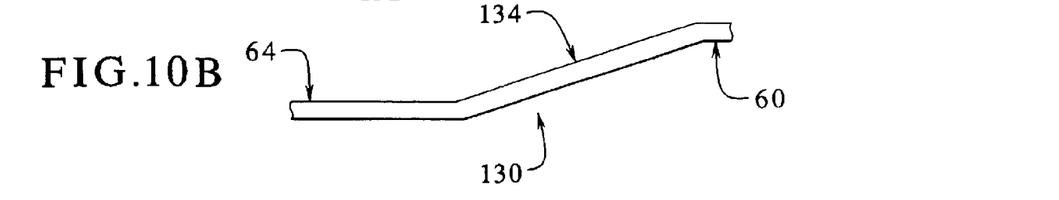
FIG. 10B is an elevated side view of the deformation section of FIG. 10A.
Figure 11A:
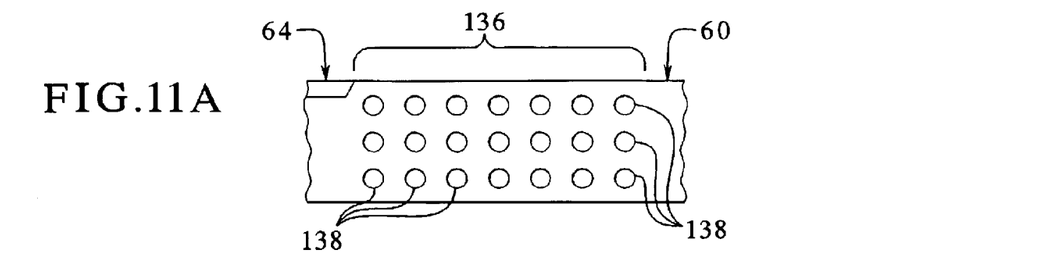
FIG. 11A is a top view of a deformation section of the mowing blade in another embodiment of the present invention.
Figure 11B:
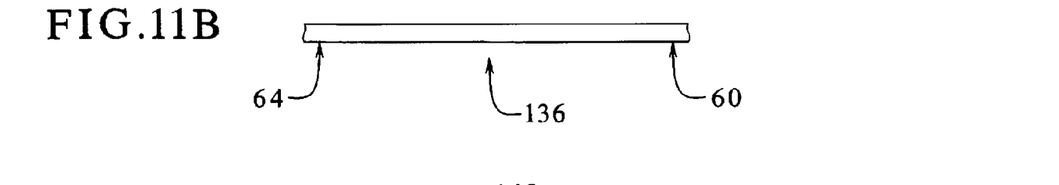
FIG. 11B is an elevated side view of the deformation section of FIG. 11A.
Figure 12A:
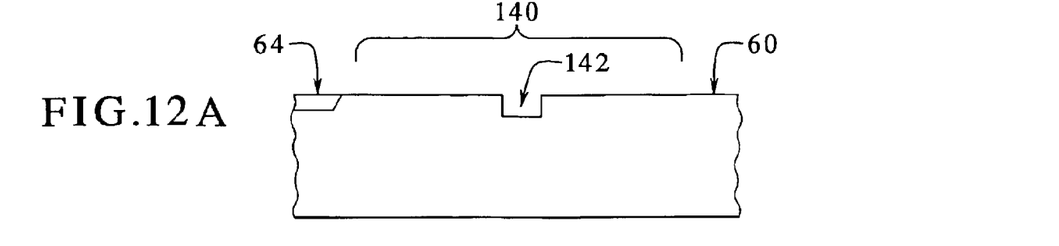
FIG. 12A is a top view of a deformation section of the mowing blade in another embodiment of the present invention.
Figure 12B:
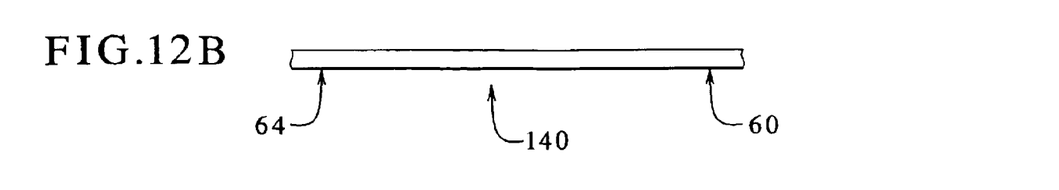
FIG. 12B is an elevated side view of the deformation section of FIG. 12A.

It should be appreciated that the energy-dissipating deformation section of the present invention can have any suitable configuration which defines one or more geometric irregularities. For example, in the embodiment illustrated in FIGS. 10A and 10B, the deformation section 130 defines: (a) a substantially rectangular opening or void 132; and (b) a ramp or bend portion 134 extending from the coupling section 60 downwardly to the cutting section 64. In another embodiment illustrated in FIGS. 11A and 11B, the deformation section 136 defines a plurality of circular openings or voids 138. In the embodiment illustrated in FIGS. 12A and 12B, the deformation section 140 defines a single rectangular notch 142.

These deformation sections of the present invention provide the mowing blade with characteristics which facilitate the deformation of the mowing blade when the mowing blade is under a particular load. Preferably, the geometric irregularities in the deformation sections either decrease buckling strength, raise stress concentration or perform both of such functions. As stress-raisers, the geometric irregularities or discontinuities concentrate stress in particular areas or zones of the deformation section. This stress concentration decreases the yield strength of the deformation section. In operation of one embodiment, when the cutting section receives a particular impact, one or more the following phenomena occur: the deformation section reaches the maximum buckling strength, the deformation section buckles, the deformation section reaches the maximum yield strength and/or the deformation section yields.

In operation of one embodiment, the mowing blade 10 spins or rotates about a vertical axis at a rate determined by the engine of the mowing machine. The stiffening member 76 of the coupling section 60 and the stiffening member 110 of the deformation section 12 prevent or reduce the deflection in the mowing blade 10 along a vertical axis. In addition, the stiffening members 76 and 110 prevent or reduce the deflection of the mowing blade 10 in response to normal cutting forces from grass or other materials suitable for cutting.

If an operator causes one of the cutting sections 64 of the mowing blade 10 to strike an obstructing object, such as a steel stake, rock or other relatively rigid object, the cutting section 64 receives a force or impact. This impact is transmitted to the deformation section 12 between such cutting section 64 and the coupling section 60. The deformation section 12 functions as an energy-dissipating element which dissipates and absorbs part or all of the force of the obstructing object. In other words, the deformation section 12 defines an energy absorbing region which deforms in response to the impact. Accordingly, a portion of the force and energy from the obstructing object is absorbed by the deformation section 12 instead of being transmitted to the drive mechanism of the mowing machine. Therefore, the drive mechanism is not deformed or, if the drive mechanism is deformed, the extent of the deformation is reduced.

In addition, depending upon the magnitude of the impact, the deformation section 12 preferably deforms to such an extent that the cutting section 64 moves from a pre-impact or non-deformed position to a post-impact or deformed position. In the deformed position, the cutting section 64 produces a blade change or blade inspection indicator. Such indicator informs the operator that the mowing blade has struck an obstructing object or otherwise that the mowing blade should be inspected or replaced. In one example, the blade change indicator is a non-uniform cutting pattern which is visible to the operator. In another example, the blade change indicator is a noise produced by the contact between the cutting section 64 and the deck or other portion of the mowing machine. In another embodiment, the blade change indicator is an increase in vibration at the handle bar, steering wheel, foot pads or frame of the mowing machine.

It should be appreciated that the cutting or mowing blade of the present invention can be used and installed on any type of cutting machine, including, but not limited to: (a) mowing machines, such as manual or self-propelled walk behind mowers, riding mowers, tractors with front, side or rear mounted mowing decks or any other type of tractor; and (b) hand-operated power tools or power equipment, such as trimmers and edgers. Furthermore, the cutting or mowing blade need not be operatively couple to and driven by drive mechanism 28 or 50. The cutting or mowing blade of the present invention can be operatively coupled to any suitable type of drive mechanism, drive assembly or transmission which transmits power to the cutting or mowing blade. Depending upon the type of cutting machine, the cutting or mowing blade can be adapted to rotate about any axis passing through the drive mechanism coupling section, including, but not limited, to a vertical axis or a horizontal axis.

The cutting or mowing blade of the present invention, in one embodiment, includes a one-piece body having a plurality of deformation zones which facilitate the deformation of the blade when the blade receives an impact or load from an obstructing object. This type of mowing blade reduces damage to drive mechanisms of mowing machines.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A cutting blade comprising:
   a one-piece member having: (a) a drive mechanism coupling section having a width, a beginning point and an ending point, the drive mechanism coupling section extending from said beginning point radially outwardly to said ending point; (b) a deformation section; and (c) a cutting section having a width, a beginning point and an ending point, the cutting section extending from said beginning point radially outwardly to said ending point, the deformation section being positioned between the ending point of the drive mechanism coupling section and the beginning point of the cutting section, a portion of the deformation section having a width that is: (i) less than the width of the drive mechanism coupling section; and (ii) less than the width of the cutting section, the deformation section positioning the drive coupling section and the cutting section in different planes.

2. The cutting blade of claim 1, wherein the deformation section has an energy dissipating deformation structure.

3. The cutting blade of claim 1, wherein the deformation section defines a lever arm which facilitates deformation of the cutting blade in response to a force received by the cutting section.

4. The cutting blade of claim 1, wherein the portion has at least one geometric irregularity, the geometric irregularity including a wall selected from the group consisting of a wall defining a square notch, a wall defining a rounded notch, a wall defining a smooth notch and a wall defining a void.

5. The cutting blade of claim 4, wherein the geometric irregularity has an arc shape.

6. The cutting blade of claim 1, wherein the the portion has: (a) one end substantially positioned in the same plane as the drive coupling section; and (b) another end substantially positioned in the same plane as the cutting section.

7. The cutting blade of claim 1, wherein the deformation section has a width which is: (a) less than the width of the drive mechanism coupling section; and (b) less than the width of the cutting section.

8. The cutting blade of claim 7, wherein the widths of the drive mechanism coupling section and cutting section are substantially equal.

9. The cutting blade of claim 1, wherein the cutting blade has a parabolic shape.

10. The cutting blade of claim 1, which includes a plurality of side walls extending from the ending point of the drive mechanism coupling section to the beginning point of the cutting section, each of said side walls defining a cross-sectional parabolic shape.

11. The cutting blade of claim 1, wherein the drive mechanism coupling section, the deformation section and the cutting section are all made of the same material.

12. The cutting blade of claim 1, wherein the cutting blade is a mowing blade.

13. The cutting blade of claim 1, wherein the drive mechanism coupling section is adapted to be operatively coupled to a machine selected from the group consisting of a mower, a tractor, a trimmer and an edger.

14. A cutting blade connectable to a drive mechanism of a machine, the cutting blade having at least one end, the cutting blade comprising:
   a drive mechanism coupling section having a width, a beginning point and an ending point, the drive mechanism coupling section extending from said beginning point, toward the end of the cutting blade, to said ending point;
   a cutting section having a width, a beginning point and an ending point, the cutting section extending from said beginning point, toward the end of the cutting blade, to said ending point; and
   at least one intermediate section positioned between the ending point of the drive mechanism coupling section and the beginning point of the cutting section, the intermediate section having a maximum width which is: (a) less than the width of the drive mechanism coupling section; and (b) less than the width of the cutting section, the intermediate section positioning the drive mechanism coupling section and the cutting section in different planes, the intermediate section operable to facilitate deformation of the cutting blade in response to a force received by the cutting section, thereby reducing damage to the drive mechanism of the machine.

15. The cutting blade of claim 14, wherein the intermediate section has at least one wall defining at least one geometric irregularity.

16. The cutting blade of claim 14, wherein the intermediate section has a ramp portion.

17. The cutting blade of claim 14, wherein the intermediate section has a position in a plurality of planes.

18. The cutting blade of claim 14, wherein the intermediate section defines a lever arm which facilitates deformation of the cutting blade in response to a force received by the cutting section.

19. The cutting blade of claim 14, wherein the intermediate section, the drive mechanism coupling section and the cutting section are integrated into one-piece member.

20. The cutting blade of claim 14, wherein the drive mechanism coupling section is adapted to be operatively coupled to a machine selected from the group consisting of a mower, a tractor, a trimmer and an edger.

21. A cutting blade connectable to a drive mechanism of a machine, the cutting blade having at least one end, the cutting blade comprising:
   a drive mechanism coupling section having a beginning point and an ending point, the drive mechanism coupling section extending from said beginning point, toward the end of the cutting blade, to said ending point;
   a cutting section having a beginning point and an ending point, the cutting section extending from said beginning point, toward the end of the cutting blade, to said ending point; and at least one intermediate section extending from the ending point of the drive mechanism coupling section to the beginning point of the cutting section, the intermediate section having an upper surface, a lower surface and a plurality of side walls, each of the side walls defining a notch, each of the notches having a length extending from one end to another end, the intermediate section operable to position: (a) the drive mechanism coupling section in a first plane; and (b) the cutting section in a second plane located below the first plane, wherein, for each of the notches, one end of the notch is substantially positioned in the first plane and the other end of the notch is substantially positioned in the second plane, the intermediate section facilitating deformation of the cutting blade in response to a force received by the cutting section, thereby reducing damage to the drive mechanism of the machine.

22. The cutting blade of claim 21, wherein each of the notches has a shape selected from the group consisting of an arc shape, a rounded shape, a smooth shape, a square shape and a rectangular shape.

* * * * *